May 14, 1929.  C. B. BROWN  1,713,372
BEAN HARVESTER
Filed July 21, 1926   3 Sheets-Sheet 1
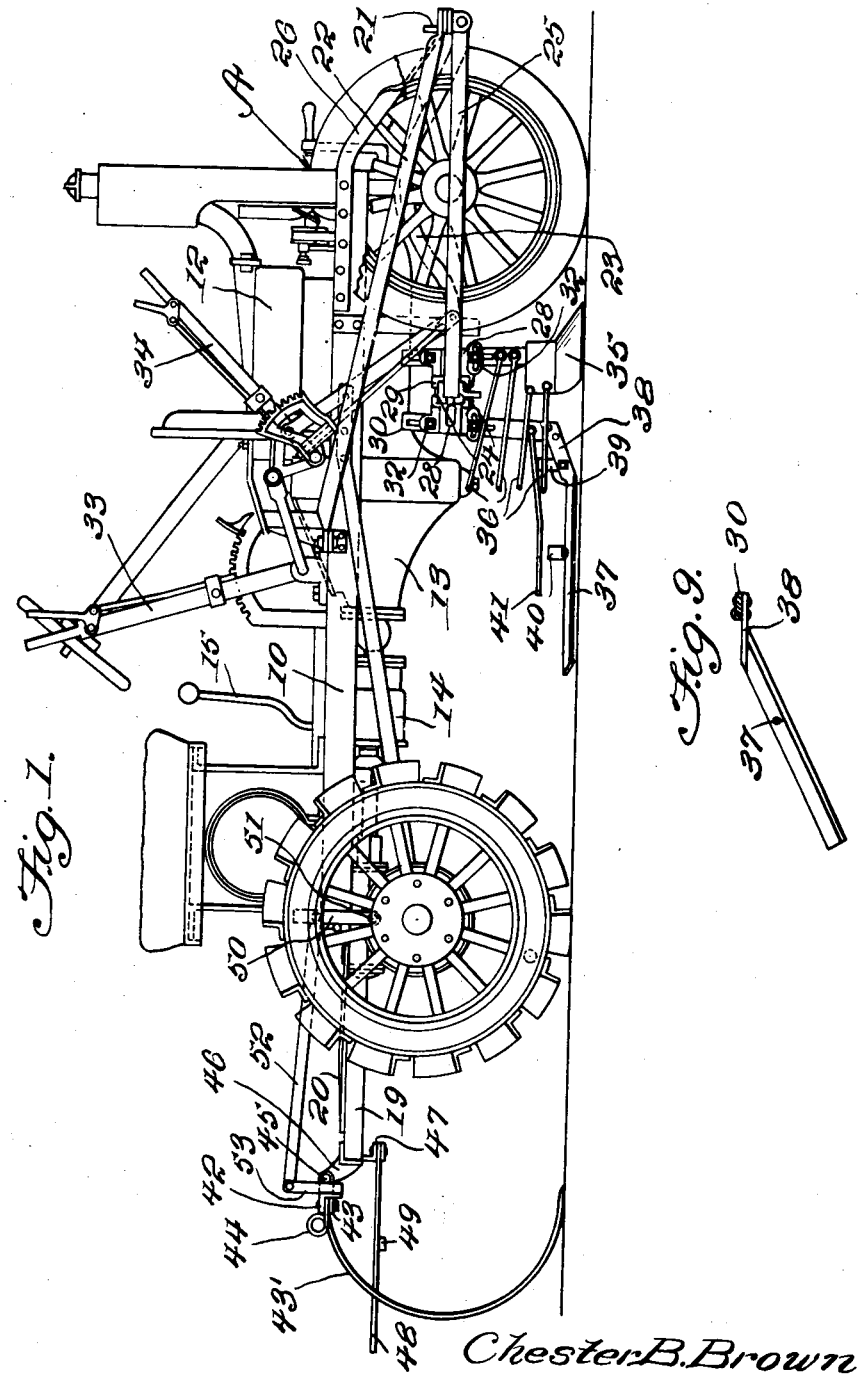
Chester B. Brown
INVENTOR
WITNESS: J.J.L. Wright
BY Victor J. Evans
ATTORNEY

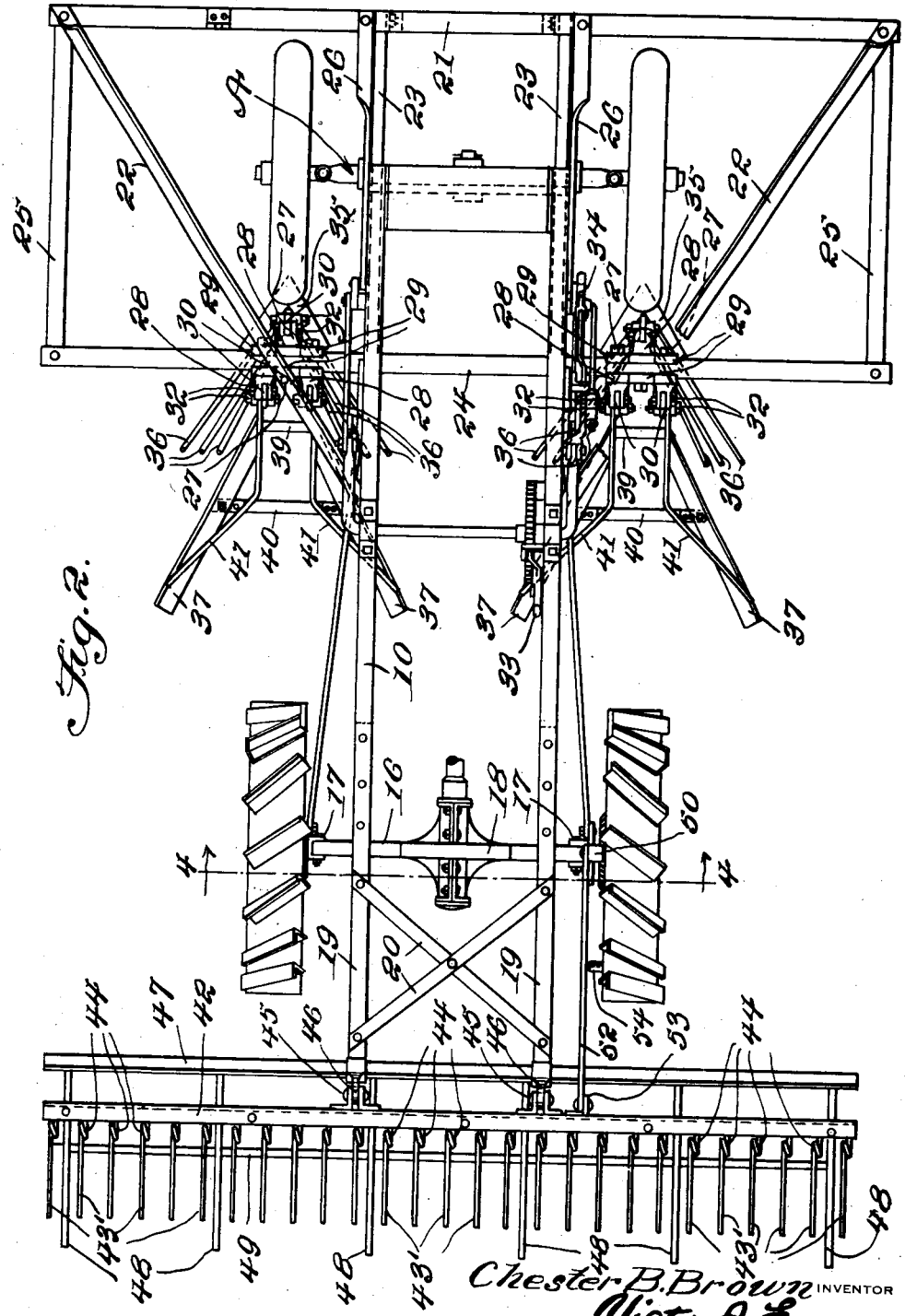

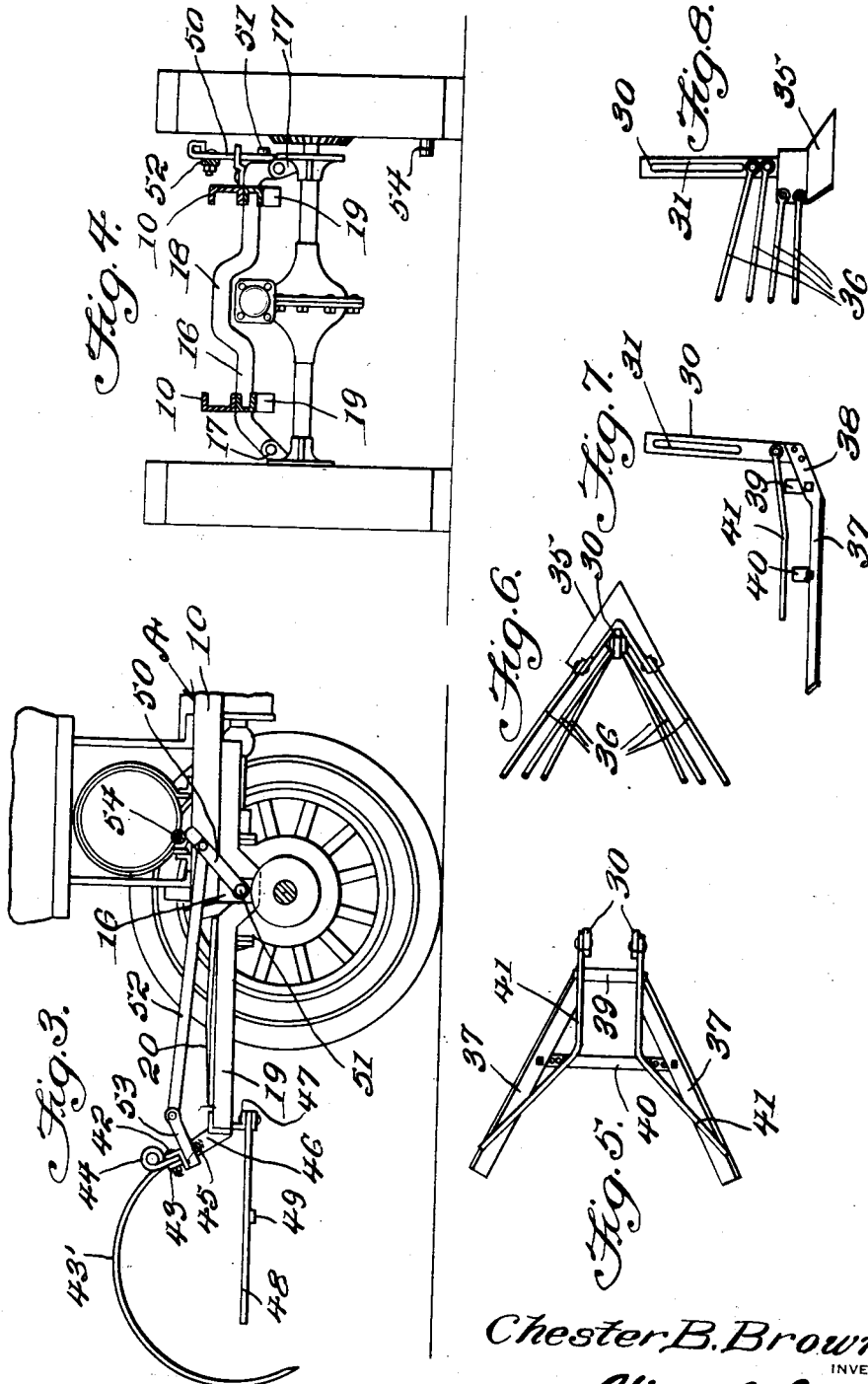

Patented May 14, 1929.

1,713,372

UNITED STATES PATENT OFFICE.

CHESTER B. BROWN, OF MORRILL, NEBRASKA.

BEAN HARVESTER.

Application filed July 21, 1926. Serial No. 124,072.

This invention contemplates the provision of a bean harvester, wherein the vines are separated or spread apart and subsequently cut beneath the surface of the ground, the cut vines being arranged in rows, and finally grouped in bunches by means carried at the rear of the machine.

In carrying out the invention I make use of an auxiliary frame upon which the spreading and cutting means are supported, with the frame mounted for adjustment and controlled by a lever, whereby its relation to the ground can be quickly and conveniently regulated.

Another object of the invention resides in the provision of bunch forming mechanism including a plurality of curved tines, mounted for movement toward and away from the ground, and automatically controlled in said movements incident to the operation of the machine.

The nature and advantages of the invention will be better understood when the following detailed description is read in connection with the accompanying drawings, the invention residing in the construction, combination and arrangement of parts as claimed.

In the drawings forming part of this application like numerals of reference indicate similar parts in the several views and wherein:

Figure 1 is a side elevation.

Figure 2 is a top plan view.

Figure 3 is a fragmentary view of the rear end of the machine showing the bunch forming mechanism mounted thereon.

Figure 4 is a sectional view taken on line 4—4 of Figure 2.

Figure 5 is a plan view of the cutting blades and the bars for arranging the cut vines in rows.

Figure 6 is a similar view of the plow and dividing arms for the vines.

Figure 7 is a view in elevation of one of the cutting blades and its adjustable shank, and also showing the adjacent rod for arranging the vines in rows.

Figure 8 is a similar view of the plow and its adjustable shank showing a plurality of vine dividing rods.

Figure 9 is a plan view of one of the cutting blades with its supporting shank in section.

Referring to the drawings in detail A indicates generally a running gear of a motor operated vehicle, and wherein 10 represents the frame thereof. A motor of the Ford type is employed indicated at 12, and this motor consequently includes a planetary transmission indicated at 13. Arranged directly behind this transmission and connected with the drive shaft of the machine is a sliding transmission 14, including a control lever 15, which is employed for the reduction of speed as the occasion may require. The rear end of the machine is braced by a transverse member 16 upon which the frame 10 reposes, the member 16 being connected with the spring perches 17 in place of the usual transverse spring, and arched as at 18. Attached to the main frame and extending rearwardly therefrom are auxiliary frame members 19 which are arranged beneath the transverse member 16, and which frame members are connected by diagonally disposed braces 20 as shown in Figure 2. The bunch forming mechanism is supported upon these auxiliary frame members 19 in a manner to be hereinafter described.

Carried by and suspended from the main frame at the forward end thereof is an auxiliary frame, which as clearly shown in Figure 2 is rectangular in plan and of a size to project an appreciable distance beyond both sides of the machine as shown. This auxiliary frame includes a front bar 21 arranged in advance of the front wheels of the machine, and which bar is braced and supported by diagonally spaced members 22 which have their corresponding rear extremities suitably secured to the sides of the main frame. This front bar 21 is further supported and braced by spaced bracing members 23 which are suitably arched as shown in Figure 1 to pass over the front axle, the extremities of these members being secured to the rear adjacent bar 24 of the auxiliary frame, while their extending forward extremities are pivotally connected with the front bar 21. These members are also connected with the bar 24, as are also the spaced parallel members 25 of the frame, the latter having their forward extremities pivotally connected with the front bar 21. Again, the front bar 21 is braced and supported by members 26 which are of angular contour to be secured to the sides of the main frame 10 from which they project forwardly and at an inclination to the front bar 21 to which they are secured. This construction and arrangement supports the auxiliary frame upon the main frame of the machine, and allows the auxiliary frame to be raised or lowered with relation to the ground, and also to be tilted endwise when the machine is moving over inclined or hollow territory. The rear bar 24 includes spaced upper and lower sections as clearly shown in Figure 1 and between these sections are passed bolts 27 which hold the cooperating parts 28 and 29 respectively of a clamp associated with said rear bar. These clamps are used in conjunction with the shanks of tools or implements to be hereinafter described, the shanks being indicated at 30, and each being provided with a slot 31, so that the latter can be adjusted vertically with relation to the bar 24 of the auxiliary frame. Bolts 32 are used to hold the shanks fixed with relation to said bar. As shown in Figure 1 there are two of such shanks 30 arranged at the rear of the bar 24 and a single shank 30 arranged in advance of said bar and in a plane between the shanks arranged at the rear thereof.

The auxiliary frame above described may be adjusted toward and away from the ground, or tilted endwise for the purpose stated, in any suitable manner, but I preferably employ the mechanism herein disclosed, and controlled by the levers 33 and 34 respectively, which mechanism is fully described and claimed in my co-pending application Serial No. 61,545. The auxiliary frame supports the shanks 30 of the various implements to be presently described.

Each shank 30 arranged at the front of the rear bar 24 has associated with the lower end thereof a plow 35, while projecting rearwardly from the plow and also from the shank are divergently disposed rods 36 which together with the plow are used to divide and separate the vines of the beans as will be readily understood. Each of the pair of shanks 30 arranged at the rear of said bar has secured to the lower end thereof a cutting blade 37, and these adjacent blades are also arranged in divergent relation, there being one blade used with each group of rods 36. The blades are arranged horizontally, although their forward ends are offset angularly as at 38 to be attached to the adjacent shank as shown in Figure 9. These blades are used in pairs for each plow, and the blades are held spaced apart in divergent relation by suitable spacing elements 39 and 40 respectively. As the machine moves over the surface, the plow 35 and rods 36 divide or separate the twisted vines as above stated, and these vines are subsequently cut beneath the surface of the ground by the adjacent blades 37. Now, carried by the shanks 30 for the blades 37, and arranged directly above the latter are angular-shaped rods 41 which are substantially V-shaped in plan as shown in Figure 5, and reversely disposed, these rods being used to throw the severed vines onto the ground in spaced rows, so that they can be conveniently bunched by a mechanism carried at the rear of the machine during the continued travel of the latter.

This bunching mechanism comprises a two part bar arranged transversely across the rear of the machine, one part of the bar being angular in cross section and indicated at 42, while the other part of the bar indicated at 43 is adapted to be bolted or otherwise suitably secured to the part 42. Between these parts of the bar a plurality of curved tines 43 are secured, each tine being formed with a resilient coil 44 at a point adjacent its connection with said bar. The bar is pivoted as at 45 upon spaced lugs 46 carried by the auxiliary members 19 of the main frame, so that the bar together with its tines can be raised and lowered with relation to the ground. When the tines are arranged in the position shown in Figure 1, they engage the cut or severed vines and arrange the latter in bunches as the machine progresses, the size of the bunch being determined by the movement of the tines away from the ground, and being subsequently lowered to form another bunch, which operation automatically takes place while the machine is in use. Secured to the auxiliary frame members 19 in parallelism with the pivoted bar 42 is an additional stationary bar 47 from which a plurality of parallel arms 48 project rearwardly, and are arranged to project between the tines 43 when the latter are in their lowermost or active positions as shown in Figure 1. Connecting these arms 48 is a bar 49 arranged parallel with the bar 47, the arrangement of these parts being such that when the tines 43 are raised or elevated, the arms 48 and bar 49 are used to move the vines from the tines, and thereby bunch the latter on the ground.

While any suitable means may be employed for automatically and intermittently moving the tines 43 forward and away from the ground for the purpose above mentioned, I preferably employ a lever 50 which is pivoted at its lower end as at 51 upon a suitable bracket adjacent one of the tractor wheels of the machine. The upper end of this lever is pivotally connected with an operating rod 52, the other end of which is connected with an extension 53 carried by the pivoted bar of the bunching device. Carried by the wheel is a pin or lug 54 which is arranged to engage the lever 50 during each revolution of the wheel, and move said lever from the position shown in Figure 1 to the position it occupies in Figure 3, during which operation of the lever the tines 43 are elevated as shown in Figure 3. After the pin 54 moves away from the lever 50, the tines gravitate to their normal positions in contact with the ground, thereby returning the lever 50 to its normal position.

It is manifest from the construction herein shown and described, that the machine accomplishes the desired results in a quick and convenient manner. In other words while the machine is moved over the ground or surface, the vines of the beans are first divided or spread apart by the plow 35 and rods 36, and are substantially cut by the blades 37 from points beneath the surface of the ground. As the vines are severed, they contact the angular-shaped rods 41 which throws the vines outwardly of the blades 37 so as not to obstruct or clog the latter, and at the same time arrange the vines in parallel rows along the surface. During the continued movement of the machine, the bunch forming mechanism is brought into use, the tines 43 thereof moving along the ground for an appreciable length of time to arrange the vines in bunches, for which purpose the tines as above stated are automatically raised and lowered once during each revolution of the tractor wheels of the machine. By this arrangement the vines are arranged in bunches approximately every ten feet, the vines being moved from the tines by the stationary framelike structure including the arms 48 and bar 49. This complete operation is performed during the progress of the machine over the surface, and the time, effort and cost of this character of work reduced to a minimum.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. A bean harvester comprising a wheeled tractor, a rigid rectangular frame fixed thereon extending outward from the wheel base, a pair of pivoted rearwardly extending plow beams carried at the forward end of the frame, a lever and quadrant to adjust the beams vertically, a plow and flat blade knife carried on vertical arms of such beam, diverging rods for diverting the vines laterally of the machine, and gathering means at the rear of the tractor.

2. A bean harvester comprising a tractor vehicle, a pair of beams pivoted forward of the wheel base, a plow and flat knife blade in alignment on each beam, a row of laterally diverging rods in fixed relation over each plow, and gathering means at the rear of the vehicle.

In testimony whereof I affix my signature.

CHESTER B. BROWN.